(12) United States Patent
Hattori et al.

(10) Patent No.: US 7,827,865 B2
(45) Date of Patent: Nov. 9, 2010

(54) SEMICONDUCTOR ACCELERATION SENSOR

(75) Inventors: Yutaka Hattori, Kanagawa (JP); Yasuo Hatano, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 204 days.

(21) Appl. No.: 11/815,556

(22) PCT Filed: Mar. 29, 2006

(86) PCT No.: PCT/JP2006/306481

§ 371 (c)(1),
(2), (4) Date: Aug. 3, 2007

(87) PCT Pub. No.: WO2006/106739

PCT Pub. Date: Oct. 12, 2006

(65) Prior Publication Data

US 2008/0271535 A1 Nov. 6, 2008

(30) Foreign Application Priority Data

Mar. 30, 2005 (JP) .............................. 2005-097901

(51) Int. Cl.
*G01P 15/12* (2006.01)
(52) U.S. Cl. .................................................. 73/514.33
(58) Field of Classification Search .............. 73/514.33, 73/514.34, 514.38; 338/2, 5
See application file for complete search history.

(56) References Cited

U.S. PATENT DOCUMENTS

| | | | | |
|---|---|---|---|---|
| 4,967,605 A | * | 11/1990 | Okada .................... | 73/862.044 |
| 5,081,867 A | * | 1/1992 | Yamada ................... | 73/514.33 |
| 5,351,542 A | * | 10/1994 | Ichimura et al. ......... | 73/514.33 |
| 5,412,986 A | * | 5/1995 | Beringhause et al. .... | 73/514.33 |
| 5,485,749 A | * | 1/1996 | Nohara et al. ............ | 73/514.33 |
| 6,293,149 B1 | * | 9/2001 | Yoshida et al. ........... | 73/514.01 |

(Continued)

FOREIGN PATENT DOCUMENTS

JP  08-075775  3/1996

(Continued)

OTHER PUBLICATIONS

International Search Report for PCT/JP2006/306481 dated Jun. 23, 2006.

*Primary Examiner*—Helen C. Kwok
(74) *Attorney, Agent, or Firm*—Knobbe Martens Olson & Bear LLP (57) ABSTRACT

The present invention is to provide a semiconductor acceleration sensor capable of sensing accelerations in two directions parallel to the surface of a diaphragm and orthogonal to each other with respective proper sensitivities. A semiconductor acceleration sensor is constituted of diaphragm pieces extending from the center of the diaphragm surface to a wafer outer-circumferential frame section, respectively, along an X axis direction and a Y axis direction orthogonal to each other. On the upper surface of the diaphragm pieces, there are formed piezo resistors Rx1 to Rx4, Ry1 to Ry4, Rz1 to Rz4. In the diaphragm pieces disposed on a single line along the X axis direction and the diaphragm pieces disposed on a single line along the Y axis direction, the areas of cross section orthogonal to the axis are set according to a maximum value of acceleration, respectively, in the X axis direction or Y axis direction.

9 Claims, 10 Drawing Sheets

U.S. PATENT DOCUMENTS

| | | | |
|---|---|---|---|
| 6,892,579 B2 * | 5/2005 | Ohtoyo et al. | 73/514.33 |
| 6,920,788 B2 * | 7/2005 | Okada | 73/514.38 |
| 7,107,847 B2 * | 9/2006 | Yoshida et al. | 73/514.33 |
| 7,111,514 B2 * | 9/2006 | Hatano et al. | 73/514.33 |
| 7,222,536 B2 * | 5/2007 | Ikeda et al. | 73/514.33 |
| 7,331,230 B2 * | 2/2008 | Takeyari et al. | 73/514.33 |
| 7,367,232 B2 * | 5/2008 | Vaganov et al. | 73/514.33 |
| 2003/0057447 A1 * | 3/2003 | Saitoh et al. | 257/200 |

FOREIGN PATENT DOCUMENTS

| | | |
|---|---|---|
| JP | 09-119943 | 5/1997 |
| JP | 09-292409 | 11/1997 |
| JP | 2000-028633 | 1/2000 |
| JP | 2004-340616 | 12/2004 |
| JP | 2005-003494 | 1/2005 |
| JP | 2005-017080 | 1/2005 |

* cited by examiner

SEMICONDUCTOR ACCELERATION SENSOR

CROSS REFERENCE TO RELATED APPLICATIONS

This application claims to benefit and priority to and is a U.S. National Phase of PCT International Application No. PCT/JP2006/306481, filed Mar. 29, 2006, designating the United States of America, which claims priority under U.S.C. §119 to Japanese Application 2005-97901 filed on Mar. 30, 2005.

TECHNICAL FIELD

The present invention relates to a semiconductor acceleration sensor, and more particularly to a semiconductor acceleration sensor that senses accelerations in directions orthogonal to each other with respective proper sensitivities.

BACKGROUND ART

There has hitherto been used semiconductor acceleration sensors disposed in a vehicle or tire of an automobile for performing vehicle posture control or sensing a distortion of the tire.

Figure 21:
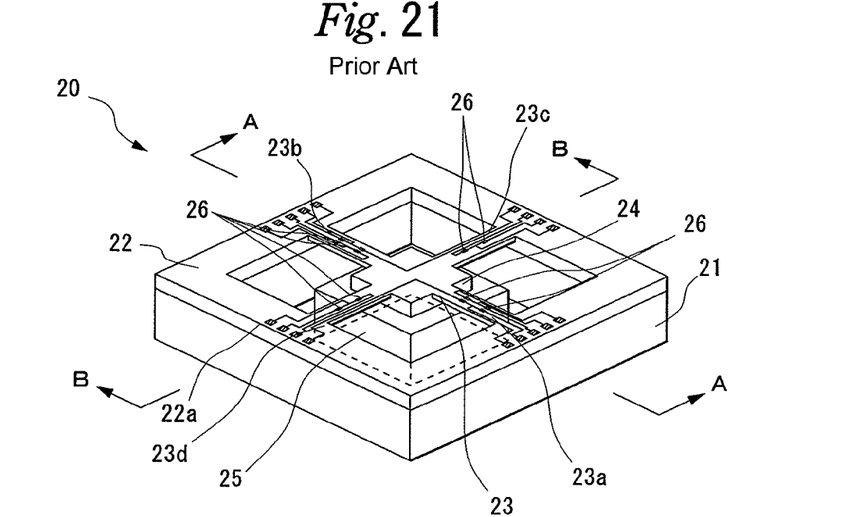
FIG. 21 is an external perspective view showing a semiconductor acceleration sensor being a conventional example.
Figure 22:
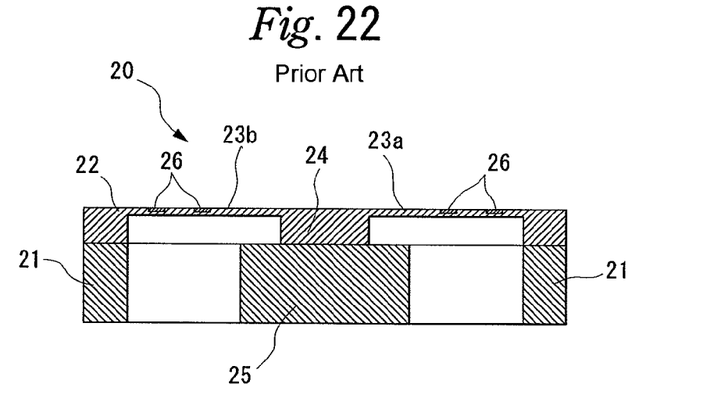
FIG. 22 is a cross-sectional view observed from the arrow direction along the line A-A shown in FIG. 21.
Figure 23:
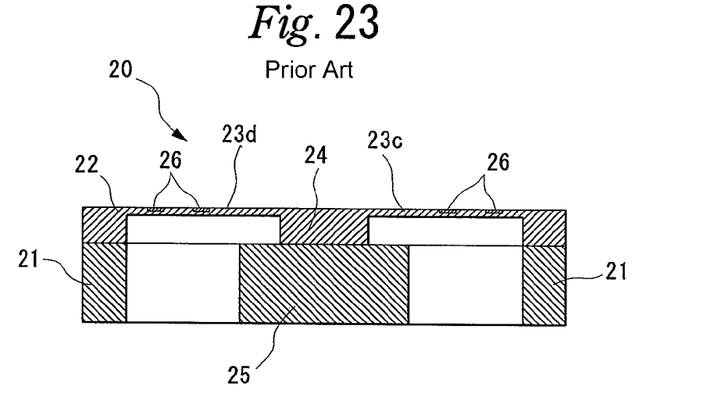
FIG. 23 is a cross-sectional view observed from the arrow direction along the line B-B shown in FIG. 21.

One example of this sort of semiconductor acceleration sensor will be described with reference to FIGS. 21 to 23. FIG. 21 is an external perspective view; FIG. 22 is a cross-sectional view observed from the arrow direction along the line A-A shown in FIG. 21; FIG. 23 is a cross-sectional view observed from the arrow direction along the line B-B shown in FIG. 21. As shown in FIG. 21, the semiconductor acceleration sensor 20 includes a pedestal 21 having a rectangular frame shape and is constituted of a silicon substrate 22 mounted on one opening plane of the pedestal 21.

Also, in the center of the silicon substrate 22 corresponding to the opening of the pedestal 21, there is formed a diaphragm 23 of thin film having a cross shape; on the upper surface of each of the diaphragm pieces 23a to 23d, there is formed a piezo resistor 26. Further, on one surface side of the center of the diaphragm 23 in the crossing section of the diaphragm pieces 23a to 23d, there is formed a thick film section 24; on the surface of the thick film section 24, there is mounted a plumb bob 25 having a rectangular solid shape made of, for example, glass.

In the semiconductor acceleration sensor 20 having the above described configuration, when force generated in association with acceleration is exerted on the plumb bob 25, distortion occurs in each of the diaphragm pieces 23a to 23d, whereby the resistance value of the piezo resistor 26 varies. Accordingly, with the resistor bridge circuit formed with the piezo resistor 26 arranged in each of the predetermined diaphragm pieces 23a to 23d, accelerations can be sensed in predetermined directions, e.g., in X axis, Y axis and Z axis directions orthogonal to each other.

As an example of the semiconductor acceleration sensor described above, there has been known semiconductor acceleration sensors disclosed in Japanese Patent Publication Nos. H8-75775 and 2000-28633.

Japanese Patent Publication No. H8-75775
Japanese Patent Publication No. 2000-28633.

DISCLOSURE OF THE INVENTION

Problems to be Solved by the Invention

For example, when an acceleration sensor is arranged with the longitudinal direction of a vehicle corresponding to the X axis, the lateral direction to the Y axis and the vertical direction to the Z axis, a maximum acceleration of about 500 G is sensed in the X-axis direction and on the other hand, an acceleration of about several G at most is sensed in the Y-axis direction. Accordingly, a semiconductor acceleration sensor having a different sensitivity is required depending on the direction of acceleration.

However, in the conventional semiconductor acceleration sensor described above, the acceleration sensitivity is approximately identical in the X axis, Y axis and Z axis directions. Thus, it is possible that when adjustment is made to a maximum value of acceleration in the X axis direction, a minor variation in acceleration in the Y axis cannot be sensed; when adjustment is made to a maximum value of acceleration in the Y axis direction, an acceleration of a predetermined value or more in the X axis cannot be sensed.

To address the above problem, an object of the present invention is to provide a semiconductor acceleration sensor capable of sensing accelerations in two directions parallel to the surface of a diaphragm and orthogonal to each other with respective proper sensitivities.

Means for Solving the Problems

To achieve the above object, the present invention proposes a semiconductor acceleration sensor comprising: a silicon wafer having a diaphragm formed within a wafer outer-circumferential frame section; a pedestal securing the wafer outer-circumferential frame section; a plumb bob disposed in the center of one surface of the diaphragm; and a plurality of beams extending, respectively, from the center of surface of the diaphragm to the wafer outer-circumferential frame section along X axis and Y axis directions parallel to the surface of the diaphragm and orthogonal to each other, wherein the areas of cross section of the plurality of beams orthogonal to each axis at a predetermined position are set according to a maximum value of respective accelerations in the X axis and Y axis directions.

According to the semiconductor acceleration sensor having the above described configuration, there are provided the plurality of beams extending, respectively, from the center of surface of the diaphragm to the wafer outer-circumferential frame section along the X axis and Y axis directions parallel to the surface of the diaphragm and orthogonal to each other, and the areas of cross section of the beams orthogonal to each axis at the predetermined position are set according to the maximum value of respective accelerations in the X axis and Y axis directions. Here, when force is exerted by acceleration, the diaphragm is distorted in a direction of the force working, but the displacement is inversely proportional to the cross section area of the diaphragm. Accordingly, when accelerations having the same amplitude are exerted, respectively, in the X axis and Y axis directions, each of the beams are displaced in inverse proportion to the maximum value of acceleration in each axis.

Also, the present invention proposes the semiconductor acceleration sensor having the above described configuration, wherein in each of the beam disposed along the X axis direction and the beam disposed along the Y axis direction, the cross section area at two points symmetrical around the center is identical.

According to the semiconductor acceleration sensor having the above described configuration, in each of the beam of the X axis direction and the beam of the Y axis direction, the cross section area at two points symmetrical around the center is identical. Here, when force by acceleration is exerted, the diaphragm is distorted in a direction of the force working, but the displacement is inversely proportional to the cross section area of the diaphragm. Accordingly, each of the beams are displaced symmetrically around the center.

Also, the present invention proposes the semiconductor acceleration sensor having the above described configuration, wherein in the beam disposed along the X axis direction and/or the beam disposed along the Y axis direction, the cross section area increases in a direction from the center to the wafer outer-circumferential frame section.

According to the semiconductor acceleration sensor having the above described configuration, the cross section area of at least one of the beam disposed along the X axis direction and the beam disposed along the Y axis direction increases in a direction from the center to the wafer outer-circumferential frame section. Here, when force by acceleration is exerted, the diaphragm is distorted in a direction of the force working, but the displacement is inversely proportional to the cross section area of the diaphragm. Accordingly, the nearer the center, the larger the displacement of each of the beams.

Also, the present invention proposes the semiconductor acceleration sensor having the above described configuration, wherein to allow sensing of respective accelerations in the X axis and Y axis directions and a Z axis direction orthogonal to the surface of the diaphragm, a diffused resistor is arranged in each of the plurality of beams and at the same time, on the wafer outer-circumferential frame section corresponding to each of the plurality of beams, there is provided an connection electrode connected to the diffused resistor.

According to the semiconductor acceleration sensor having the above described configuration, to allow sensing of respective accelerations in the X axis and Y axis directions and the Z axis direction orthogonal to the surface of the diaphragm, the diffused resistor is arranged along each of the plurality of beams, and these diffused resistors are each connected to the electrode disposed on the wafer outer-circumferential frame section. Accordingly, an external circuit can be connected to the diffused resistor via the electrode, and the resistance value of the diffused resistor varies in association with displacement of the diaphragm.

Also, the present invention proposes the semiconductor acceleration sensor having the above described configuration, wherein the diaphragm is a silicon piezo diaphragm.

According to the semiconductor acceleration sensor having the above described configuration, the resistance value of the piezo resistor varies in association with displacement of the diaphragm.

Also, the present invention proposes the semiconductor acceleration sensor having the above described configuration, wherein in one surface side and/or the other surface side of the diaphragm, there is provided a protrusion secured to a position spaced with a predetermined gap from the surface of the center of the diaphragm and/or from the surface of the plumb bob corresponding to the center, and protruding opposite the center.

According to the semiconductor acceleration sensor having the above described configuration, when force of a predetermined value or more is exerted by an acceleration generated in a direction orthogonal to the surface of the diaphragm, the diaphragm is distorted and stretched in a direction of the force working. However, the displacement is limited by the protrusion, so the diaphragm cannot be stretched to a maximum. Accordingly, when an excessive acceleration is generated in a direction orthogonal to the surface of the diaphragm, also, the position of the plumb bob changes with the tip end of the protrusion acting as a supporting point, so an acceleration in a direction parallel to the surface of the diaphragm can be sensed.

Also, the present invention proposes the semiconductor acceleration sensor having the above described configuration, wherein the protrusion is secured and supported to the wafer outer-circumferential frame section and/or the pedestal and disposed at a position spaced with a predetermined gap from the center of the other surface of the diaphragm so as to protrude opposite the center of the other surface of the diaphragm.

According to the semiconductor acceleration sensor having the above described configuration, when force of a predetermined value or more is exerted on the other surface side of the diaphragm by an acceleration generated in a direction orthogonal to the surface of the diaphragm, the diaphragm is distorted and stretched in a direction of the force working. However, the displacement is limited by the protrusion, so the diaphragm cannot be stretched to a maximum. Accordingly, when force of the predetermined value or more is exerted on the other surface side of the diaphragm, also, the position of the plumb bob changes with the tip end of the protrusion acting as a supporting point, so an acceleration in a direction parallel to the surface of the diaphragm can be sensed.

Also, the present invention proposes the semiconductor acceleration sensor having the above described configuration, wherein the protrusion is joined and supported to the wafer outer-circumferential frame section and/or the pedestal and disposed at a position spaced with a predetermined gap from the center of the plumb bob so as to protrude opposite the surface of the plumb bob.

According to the semiconductor acceleration sensor having the above described configuration, when force of a predetermined value or more is exerted on one surface side of the diaphragm by an acceleration generated in a direction orthogonal to the surface of the diaphragm, the diaphragm is distorted and stretched in a direction of the force working. However, the displacement is limited by the protrusion, so the diaphragm cannot be stretched to a maximum. Accordingly, when force of the predetermined value or more is exerted on the one surface side of the diaphragm, also, the position of the plumb bob changes with the tip end of the protrusion acting as a supporting point, so an acceleration in a direction parallel to the surface of the diaphragm can be sensed.

Also, the present invention proposes the semiconductor acceleration sensor having the above described configuration, wherein the tip end of the protrusion corresponding to the surface of the center of the diaphragm and/or to the surface of the plumb bob corresponding to the center has a cone-shaped tip end configuration.

According to the semiconductor acceleration sensor having the above described configuration, when force of a predetermined value or more is exerted by an acceleration generated in a direction orthogonal to the surface of the diaphragm, the diaphragm is distorted and stretched in a direction of the force working. However, the displacement is supported and limited by the cone-shaped tip end of the protrusion, so the diaphragm cannot be stretched to a maximum. At the same time, when an excessive acceleration is generated in a direction orthogonal to the surface of the diaphragm, also, the position of the plumb bob changes with the tip end of the protrusion acting as a supporting point, so an acceleration in a direction parallel to the surface of the diaphragm can be sensed.

Advantages of the Invention

According to the present invention, the area of cross section orthogonal to the X axis of the diaphragm pieces being the beams disposed on a single line along the X axis direction and the area of cross section orthogonal to the Y axis of the diaphragm pieces being the beams disposed on a single line along the Y axis direction are each symmetrical around the central of the diaphragm and set according to a maximum value of respective accelerations in the X axis or Y axis directions, the X axis and Y axis being parallel to the surface of the diaphragm and orthogonal to each other. Consequently, displacement occurs in inverse proportion to the maximum value of acceleration in each axis, and accelerations in two directions parallel to the surface of the diaphragm and orthogonal to each other can be sensed with respective proper sensitivities. Also, the cross section area increases in a direction from the center of the diaphragm to the wafer outer-circumferential frame section, so the nearer the center of the diaphragm, the larger the displacement of the diaphragm piece and at the same time, the more significant the variation in piezo resistor, thus allowing sensing of accelerations with higher accuracy.

Further, when an excessive acceleration is generated in a direction orthogonal to the surface of the diaphragm, the position of the plumb bob changes with the tip end of the protrusion acting as a supporting point. Accordingly, a highly excellent effect is achieved that even when the cross section area of the diaphragm piece is reduced to vary the sensitivity, accelerations in two directions parallel to the surface of the diaphragm and orthogonal to each other can be effectively sensed.

These and other objects, features and advantages according to the present invention will be evident from the following description and the accompanying drawings.

DESCRIPTION OF SYMBOLS 10, 10A, 10B . . . semiconductor acceleration sensor, 11 . . . pedestal, 12 . . . silicon substrate, 12a . . . wafer outer-circumferential section frame, 121 . . . electrode, 13 . . . diaphragm, 13a to 13d . . . diaphragm piece, 14 . . . thick film section, 15 . . . plumb bob, 16 . . . support body, 161 . . . outer frame section, 162 . . . supporting column, 163 . . . beam section, 164 . . . protrusion, 164a . . . tip end, 31A to 31C . . . voltage detector, 32A to 32C . . . DC power supply, 50 . . . support body, 501 . . . outer frame section, 502 . . . supporting column, 503 . . . beam section, 504 . . . protrusion, 504a . . . tip end, d1 . . . distance, Rx1 to Rx4, Ry1 to Ry4, Rz1 to Rz4 . . . piezo resistor (diffused resistor)

BEST MODE FOR CARRYING OUT THE INVENTION

An embodiment of the present invention will be described with reference to the drawings.

Figure 1:
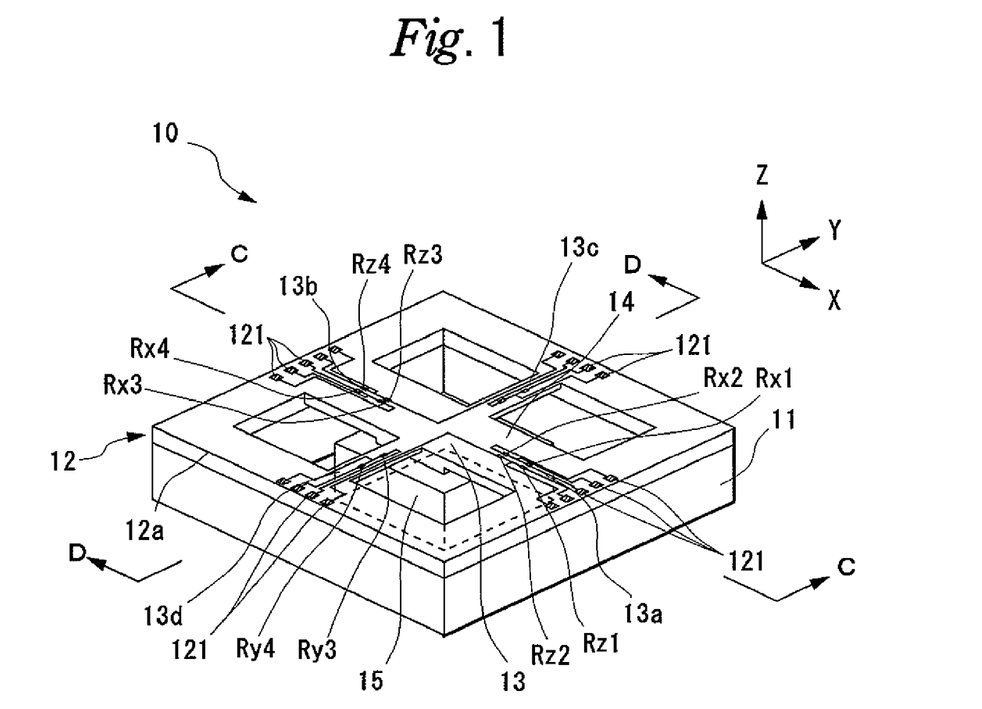
FIG. 1 is an external perspective view showing a semiconductor acceleration sensor according to a first embodiment of the present invention.
Figure 2:
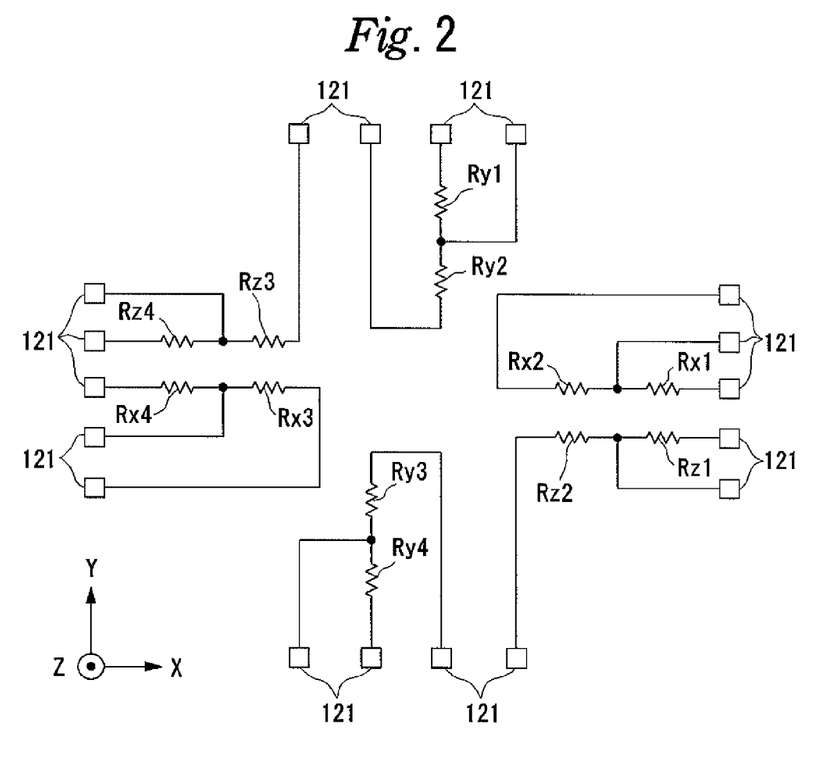
FIG. 2 is a configuration diagram showing an electrical circuit of the semiconductor acceleration sensor according to the first embodiment of the present invention.

FIG. 1 is an external perspective view showing a semiconductor acceleration sensor according to a first embodiment of the present invention. Referring to FIG. 1, the semiconductor acceleration sensor 10 is constituted of a pedestal 11 and a silicon substrate 12. The pedestal 11 has a rectangular frame shape. On one open surface of the pedestal 11, there is mounted the silicon substrate 12 (silicon wafer).

In the opening of the pedestal 11, there is provided the silicon substrate 12; in the center within a wafer outer-circumferential frame section 12a of the silicon substrate 12, there is formed a diaphragm 13 of thin film having a cross shape. The diaphragm 13 is constituted of diaphragm pieces 13a to 13d being four beams each extending from the center of the diaphragm surface to the wafer outer-circumferential frame section 12a along an X axis direction and a Y axis direction orthogonal to each other; on the upper surface of the diaphragm pieces, there are formed piezo resistors (diffused resistors) Rx1 to Rx4, Ry1 to Ry4, Rz1 to Rz4.

Specifically, in one diaphragm piece 13a of the diaphragm pieces 13a and 13b disposed on a single line, there are formed the piezo resistors Rx1, Rx2, Rz1 and Rz2; in the other diaphragm piece 13b, there are formed the piezo resistors Rx3, Rx4, Rz3 and Rz4. Also, in one diaphragm piece 13c of the diaphragm pieces 13c and 13d disposed on a single line orthogonal to the diaphragm pieces 13a and 13b, there are formed the piezo resistors Ry1 and Ry2; in the other diaphragm piece 13d, there are formed the piezo resistors Ry3 and Ry4.

Also, the piezo resistors Rx1 to Rx4, Ry1 to Ry4, and Rz1 to Rz4 are connected to a connection electrode 121 disposed on the surface of the outer-circumferential section of the silicon substrate 12 so that they can constitute a resistor bridge circuit for sensing accelerations in the directions of the X axis, Y axis and Z axis orthogonal to each other.

Further, on one surface side of the center of the diaphragm 13 in the crossing section of the diaphragm pieces 13a to 13d, there is formed a thick film section 14; on the surface of the thick film section 14, there is mounted a plumb bob 15 having a rectangular solid shape made of, for example, glass.

Figure 3:
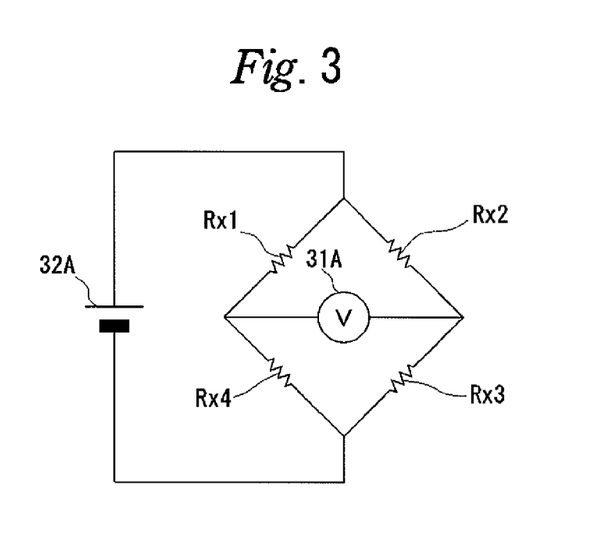
FIG. 3 is a view showing a bridge circuit sensing an acceleration in an X axis direction using the semiconductor acceleration sensor according to the first embodiment of the present invention.
Figure 4:
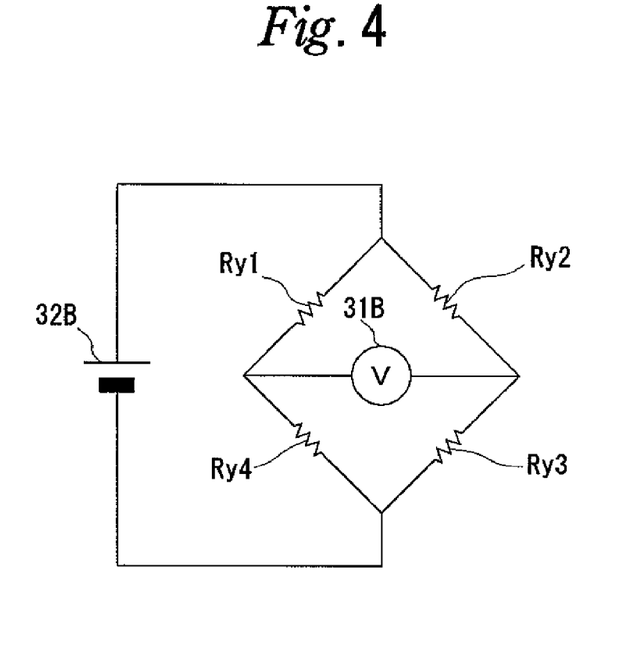
FIG. 4 is a view showing a bridge circuit sensing an acceleration in a Y axis direction using the semiconductor acceleration sensor according to the first embodiment of the present invention.
Figure 5:
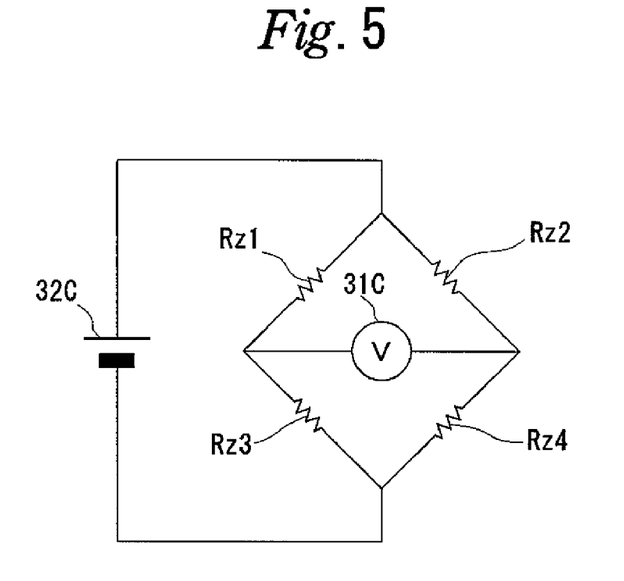
FIG. 5 is a view showing a bridge circuit sensing an acceleration in a Z axis direction using the semiconductor acceleration sensor according to the first embodiment of the present invention.

When the semiconductor acceleration sensor 10 having the above described configuration is used, three resistor bridge circuits are constructed as shown in FIGS. 3 to 5. More specifically, in a bridge circuit for sensing an acceleration in the x axis direction, as shown in FIG. 3, the positive electrode of a DC power supply 32A is connected to a connection point between one end of a piezo resistor Rx1 and one end of a piezo resistor Rx2, and the negative electrode of the direct current power source 32A is connected to a connection point between one end of a piezo resistor Rx3 and one end of a piezo resistor Rx4. Further, one end of a voltage detector 31A is connected to a connection point between the other end of the piezo resistor Rx1 and the other end of the piezo resistor Rx4, and the other end of the voltage detector 31A is connected to a connection point between the other end of the piezo resistor Rx2 and the other end of the piezo resistor Rx3.

Also, in a bridge circuit for sensing an acceleration in the Y axis direction, as shown in FIG. 4, the positive electrode of a DC power supply 32B is connected to a connection point between one end of a piezo resistor Ry1 and one end of a piezo resistor Ry2, and the negative electrode of the DC power supply 32B is connected to a connection point between one end of a piezo resistor Ry3 and one end of a piezo resistor Ry4. Further, one end of a voltage detector 31B is connected to a connection point between the other end of the piezo resistor Ry1 and the other end of the piezo resistor Ry4, and the other end of the voltage detector 31B is connected to a connection point between the other end of the piezo resistor Ry2 and the other end of the piezo resistor Ry3.

Also, in a bridge circuit for sensing an acceleration in the Z axis direction, as shown in FIG. 5, the positive electrode of a DC power supply 32C is connected to a connection point between one end of a piezo resistor Rz1 and one end of a piezo resistor Rz2, and the negative electrode of the DC power supply 32C is connected to a connection point between one end of a piezo resistor Rz3 and one end of a piezo resistor Rz4. Further, one end of a voltage detector 31C is connected to a connection point between the other end of the piezo resistor Rz1 and the other end of the piezo resistor Rz3, and the other end of the voltage detector 31C is connected to a connection point between the other end of the piezo resistor Rz2 and the other end of the piezo resistor Rz4.

When force generated in association with acceleration applied to the sensor 10 is exerted on the plumb bob 15, distortion occurs in each of the diaphragm pieces 13a to 13d, whereby the value of the piezo resistors Rx1 to Rx4, Ry1 to Ry4 and Rz1 to Rz4 varies. Accordingly, with the resistor bridge circuit formed with the piezo resistors Rx1 to Rx4, Ry1 to Ry4 and Rz1 to Rz4 disposed in each of the diaphragm pieces 13a to 13d, accelerations are sensed in the directions of the X axis, Y axis and Z axis orthogonal to each other.

Figure 6:
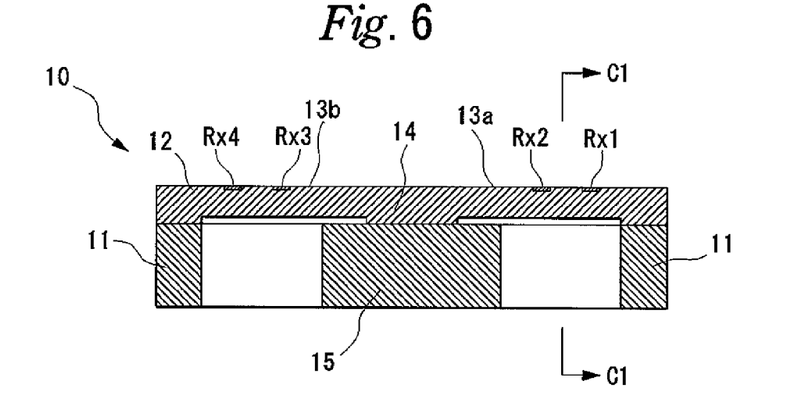
FIG. 6 is a cross-sectional view observed from the arrow direction along the line C-C shown in FIG. 1.
Figure 7:
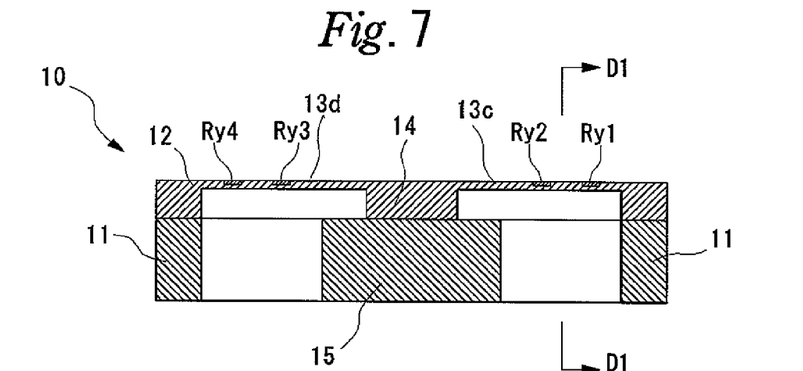
FIG. 7 is a cross-sectional view observed from the arrow direction along the line D-D shown in FIG. 1.
Figure 8:
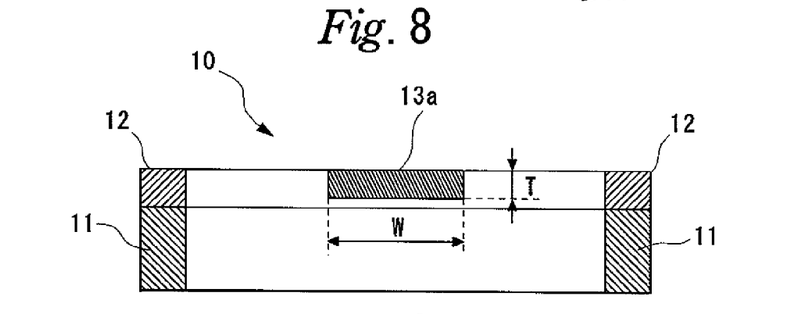
FIG. 8 is a cross-sectional view observed from the arrow direction along the line C1-C1 shown in FIG. 6.

There will now be described the configuration of the diaphragm pieces 13a to 13d by which the present invention is characterized. FIG. 6 is a cross-sectional view observed from the arrow direction along the line C-C shown in FIG. 1; FIG. 7 is a cross-sectional view observed from the arrow direction along the line D-D shown in FIG. 1; FIG. 8 is a cross-sectional view observed from the arrow direction along the line C1-C1 shown in FIG. 6; and FIG. 9 is a cross-sectional view observed from the arrow direction along the line D1-D1 shown in FIG. 7.

In the diaphragm pieces 13a and 13b disposed on a single line along the X axis direction and the diaphragm pieces 13c and 13d disposed on a single line along the Y axis direction, the areas of cross section orthogonal to each axis are uniform and set according to a maximum value of acceleration, respectively, in the X axis direction or the Y axis direction. According to the present embodiment, it is assumed that accelerations are sensed with the longitudinal direction of a vehicle corresponding to the X axis and the lateral direction to the Y axis, and the cross section area of the diaphragm pieces 13a and 13b along the X axis direction is set larger than that of the diaphragm pieces 13c and 13d along the Y axis direction.

When force by acceleration is exerted, the diaphragm 13 distorts in a direction of the force working. However, its displacement is in inverse proportion to the cross section area of the diaphragm pieces 13a to 13d. Consequently, when an acceleration of the same amplitude is applied in each of the X axis direction and Y axis direction, the diaphragm pieces 13a to 13d are displaced in inverse proportion to the maximum value of acceleration in each axis. Also, the cross section areas of each of the diaphragm pieces 13a to 13d are uniform and symmetrical around the center of the diaphragm 13, so the diaphragm pieces are displaced symmetrically around the center.

Figure 9:
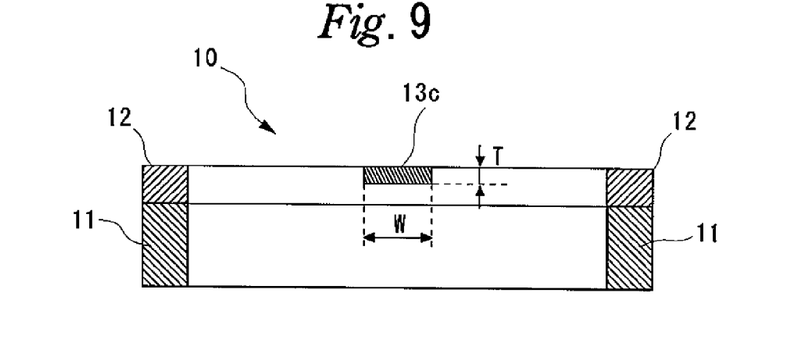
FIG. 9 is a cross-sectional view observed from the arrow direction along the line D1-D1 shown in FIG. 7.
Figure 10:
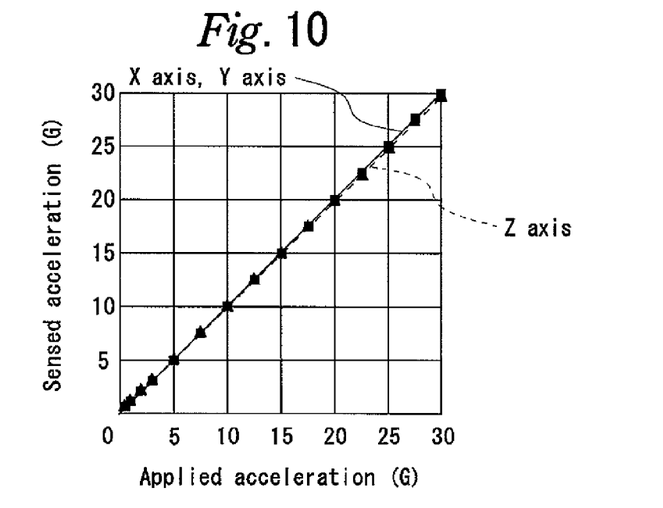
FIG. 10 is a view showing experimental results of accelerations sensed by a diaphragm according to the first embodiment of the present invention.

Here, as shown in FIGS. 8 and 9, when the width of the diaphragm piece is W and the thickness is T, experimental results of accelerations sensed by the diaphragm 13 is shown in FIG. 10, where the width and thickness of each said diaphragm pieces 13a to 13d are 100 [μm] and 14 [μm], respectively. When the acceleration applied to the diaphragm 13 is 0 to 30 [G], the difference between the sensed acceleration in the directions of the X axis, Y axis and Z axis and the applied acceleration was 1% or less.

Figure 11:
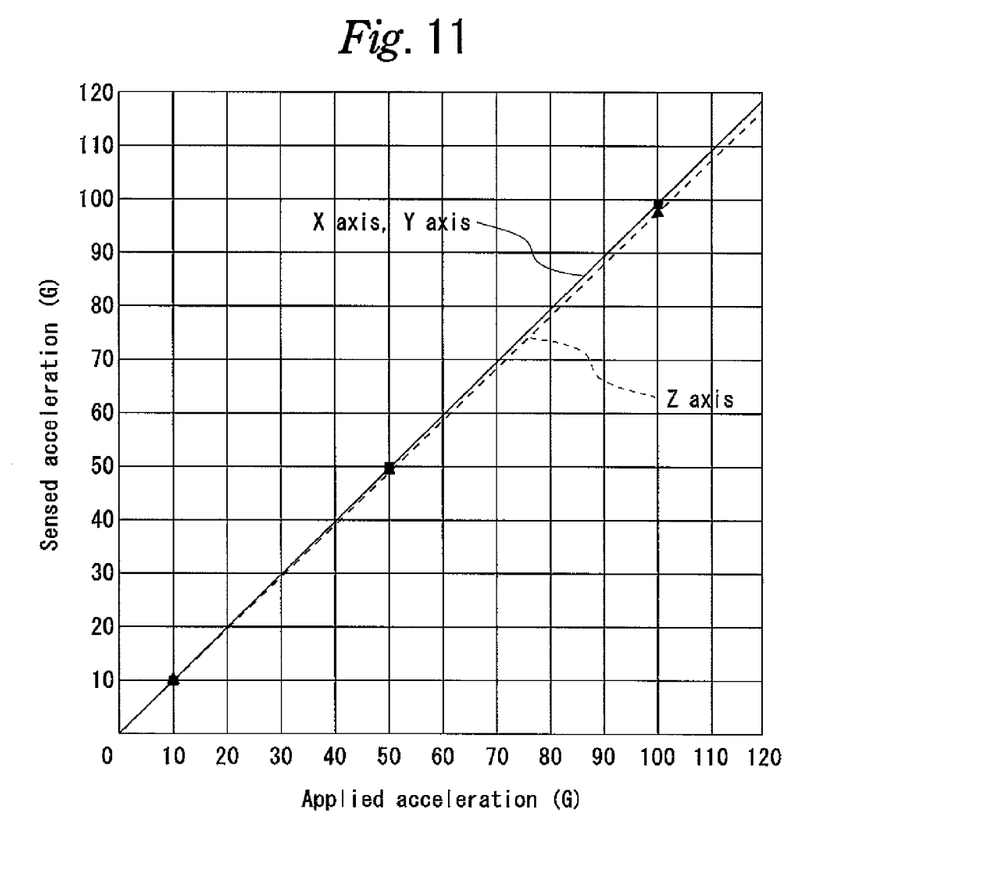
FIG. 11 is a view showing experimental results of accelerations sensed by the diaphragm according to the first embodiment of the present invention.

Also, when the width and thickness of each said diaphragm pieces 13a to 13d are 70 [μm] and 20 [μm], respectively, experimental results of accelerations sensed by the diaphragm 13 is shown in FIG. 11. When the applied acceleration is 0 to 100 [G], the difference between the sensed accelerations in the directions of the X axis and Y axis and the applied acceleration was 1% or less, and the difference between the sensed acceleration in the Z axis direction and the applied acceleration was 3% or less.

Figure 12:
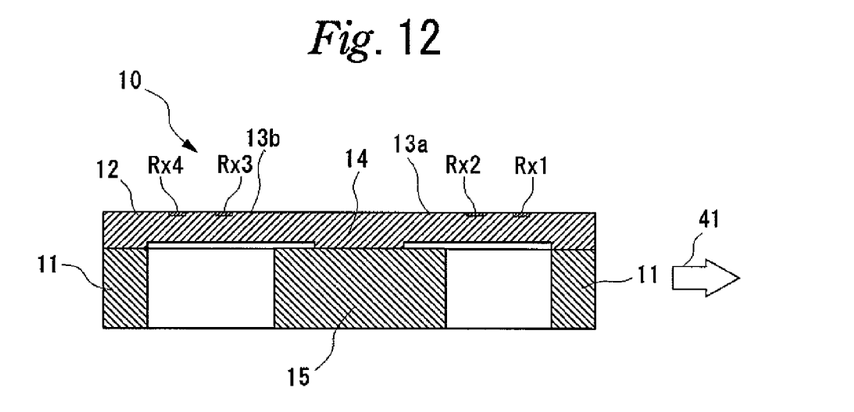
FIG. 12 is a view for explaining the operation of the semiconductor acceleration sensor according to the first embodiment of the present invention.
Figure 13:
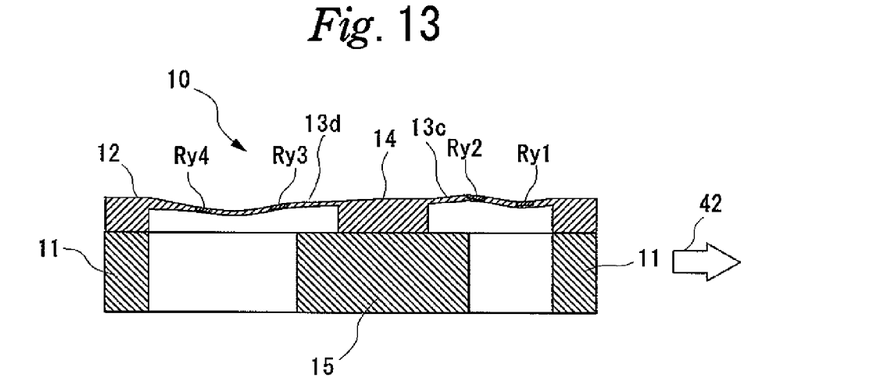
FIG. 13 is a view for explaining the operation of the semiconductor acceleration sensor according to the first embodiment of the present invention.
Figure 14:
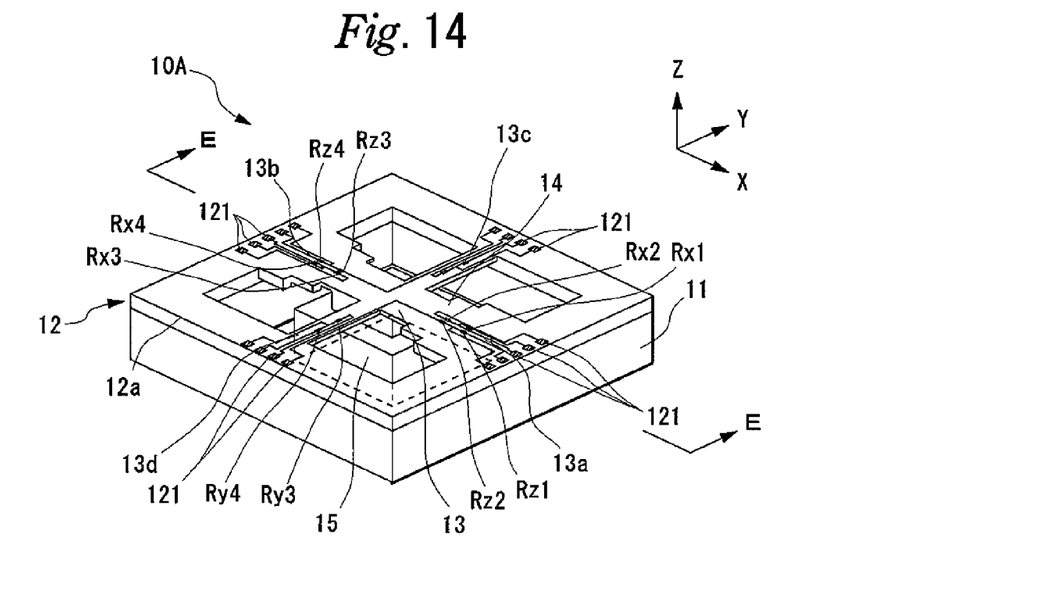
FIG. 14 is an external perspective view showing another semiconductor acceleration sensor according to the first embodiment of the present invention.
Figure 15:
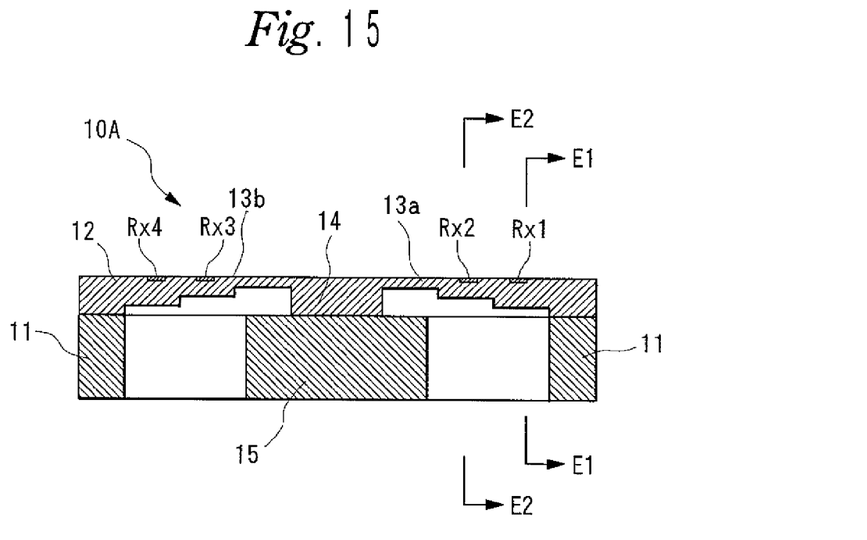
FIG. 15 is a cross-sectional view observed from the arrow direction along the line E-E shown in FIG. 14.
Figure 16:
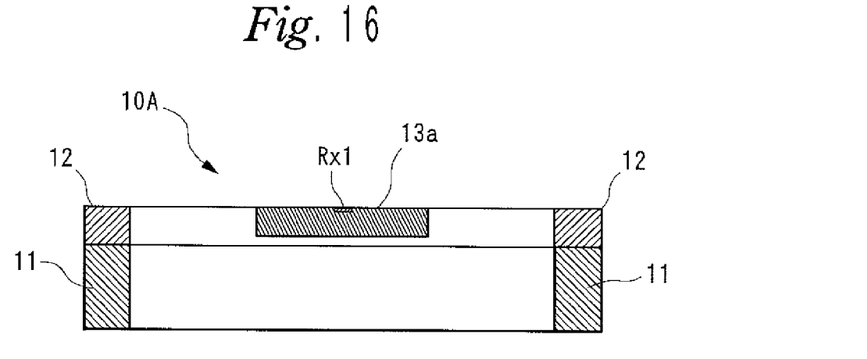
FIG. 16 is a cross-sectional view observed from the arrow direction along the line E1-E1 shown in FIG. 14.
Figure 17:
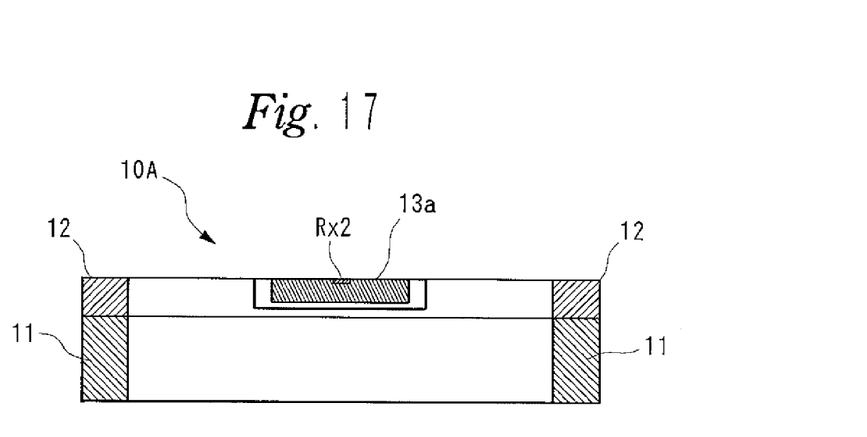
FIG. 17 is a cross-sectional view observed from the arrow direction along the line E2-E2 shown in FIG. 14.

As shown in FIGS. 12 and 13, when accelerations having the same amplitude are generated in the directions of the X axis and Y axis parallel to the surface of the diaphragm 13 and orthogonal to each other and force 41 and 42 by the accelerations work, the diaphragm is stretched in the directions of the force 41 and 42 working. In this case, since the cross section area of the diaphragm pieces 13a and 13b is large, displacement by the force 41 hardly occurs; in contrast, since the cross section area of the diaphragm pieces 13c and 13d is small, large displacement by the force 42 occurs.

According to the present embodiment, there is shown the diaphragm 13 in which the cross section areas of each said diaphragm pieces 13a to 13d are uniform. However, it is sufficient that the cross section areas of each said diaphragm pieces 13a to 13d are symmetrical around the center of the diaphragm 13. As shown in FIGS. 14 to 17, in the diaphragm pieces 13a and 13b disposed on a single line along the X axis direction, when the cross section area increases in a direction from the center of the diaphragm 13 to the wafer outer-circumferential frame section 12a, then the nearer the center of the diaphragm, the larger the displacement of the diaphragm pieces 13a and 13b. Particularly, the cross section area is varied stepwise between the position of the piezo resistors Rx1 to Rx4 formed and the other position, so the variation in resistance value of the piezo resistors Rx1 to Rx4 is significant.

In this manner, according to the semiconductor acceleration sensor 10 having the above described configuration, with respect to the diaphragm pieces 13a and 13b disposed on a single line along the X axis direction and the diaphragm pieces 13c and 13d disposed on a single line along the Y axis direction, the X axis and Y axis being parallel to the surface of the diaphragm and orthogonal to each other, the areas of cross section orthogonal to each axis are symmetrical around the central of the diaphragm 13 and set according to a maximum value of respective accelerations in the X axis or Y axis direction. Consequently, displacement occurs in inverse proportion to the maximum value of acceleration in each axis, and accelerations in the two directions parallel to the surface of the diaphragm 13 and orthogonal to each other can be sensed with respective proper sensitivities. Also, the cross section areas increase in a direction from the center of the diaphragm 13 to the wafer outer-circumferential frame section 12a, so the nearer the center of the diaphragm 13, the larger the displacement of the diaphragm pieces 13a to 13d and at the same time, the more significant the variation in the piezo resistors Rx1 to Rx4, Ry1 to Ry4, Rz1 to Rz4, thus allowing sensing of accelerations with higher accuracy.

A second embodiment of the present invention will now be described.

Figure 18:
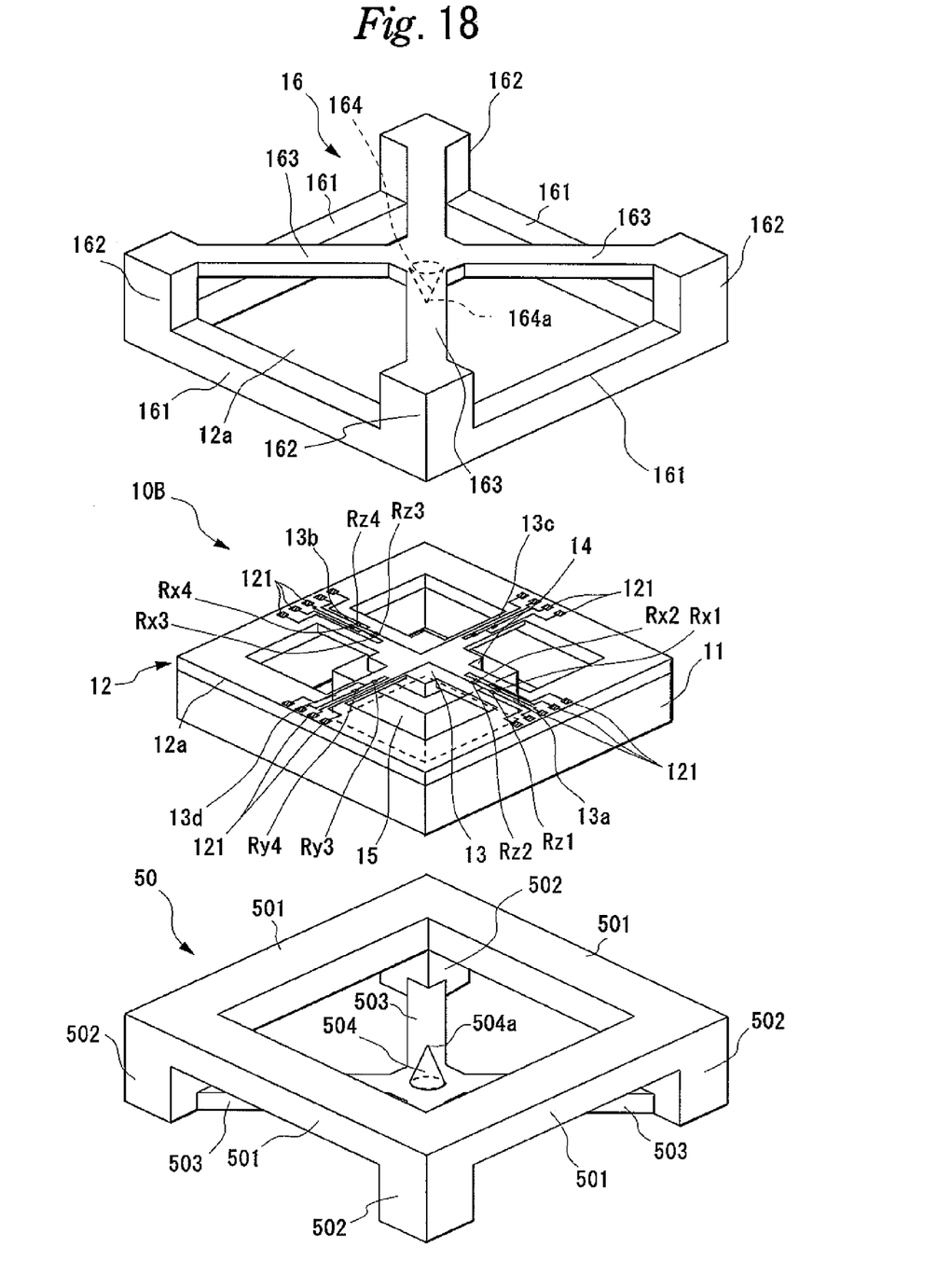
FIG. 18 is an exploded perspective view showing a semiconductor acceleration sensor according to a second embodiment of the present invention.
Figure 19:
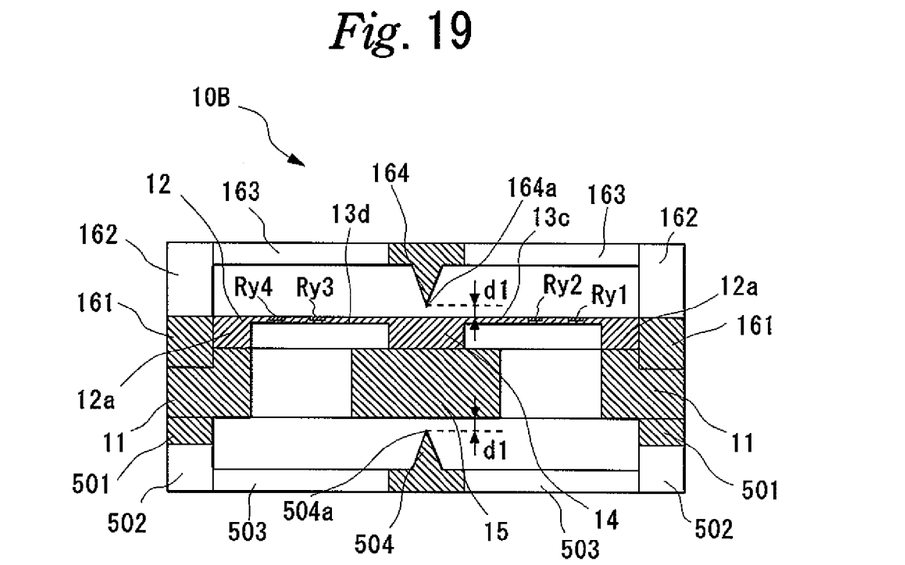
FIG. 19 is a side cross sectional view showing the semiconductor acceleration sensor according to the second embodiment of the present invention.
Figure 20:
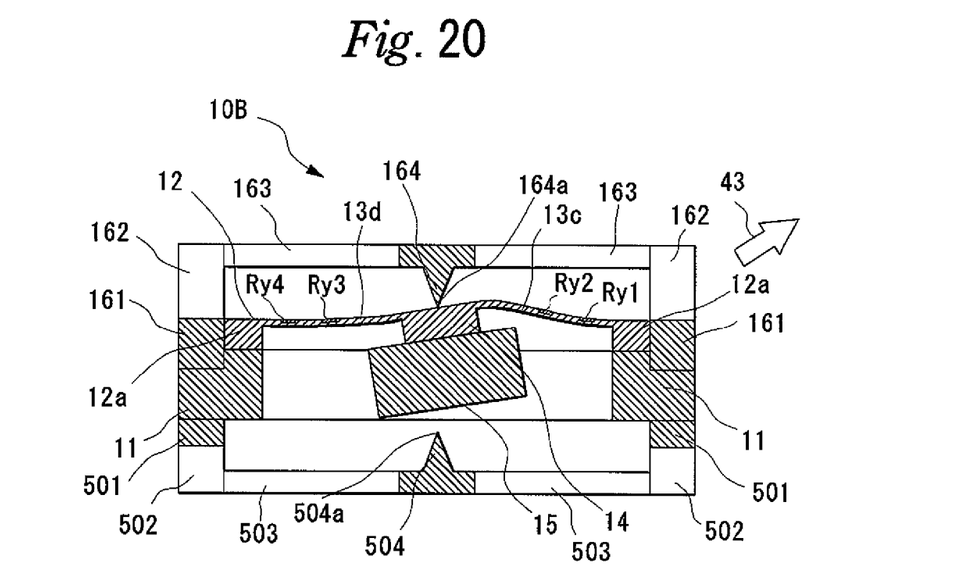
FIG. 20 is a view for explaining the operation of the semiconductor acceleration sensor according to the second embodiment of the present invention.

FIG. 18 is an exploded perspective view showing a semiconductor acceleration sensor according to a second embodiment of the present invention; FIG. 19 is a side cross sectional view thereof; and FIG. 20 is a view for explaining the operation thereof. In the drawings, the same reference characters denote constituent parts corresponding to the first embodiment described above, and an explanation thereof is omitted. The difference between the second embodiment and the first embodiment lies in that the second embodiment includes in addition to the configuration of the first embodiment, support bodies 16 and 50 having protrusions disposed both in one side where the plumb bob 15 of the diaphragm 13 is present and the other side where the plumb bob 15 of the diaphragm 13 is not present.

Referring to the drawings, the semiconductor acceleration sensor 10B is constituted of a pedestal 11, a silicon substrate 12 and the support bodies 16 and 50. To the outer-circumferential section of the pedestal 11, there is secured an outer frame section 161 of the support body 16.

The support body 16 is constituted of the outer frame section 161 having a rectangular frame shape, four supporting columns 162 installed in the four corners of the outer frame section 161, a beam section 163 having a cross shape disposed so as to join the tip ends of each supporting column 162, and a protrusion 164 having a cone shape disposed in the central, crossing part of the beam section 163.

The outer frame section 161 is fit into the outer-circumferential section of the pedestal 11 to be secured, so that the protrusion 164 is positioned in the other surface side of the diaphragm 13, i.e., in the side where the plumb bob 15 is not present. Here, a setting is made such that the tip end 164a of the protrusion 164 is positioned at a distance d1 from the surface of the diaphragm 13. The distance d1 is set to a value by which the displacement of each of the diaphragm pieces 13c and 13d can be limited by the protrusion 164 so that the diaphragm pieces are not stretched excessively even when an acceleration is generated in a direction orthogonal to the surface of the diaphragm 13 and force of a predetermined value or more caused by the acceleration is exerted on the other surface side of the diaphragm 13, i.e., on the side where the plumb bob 15 is not present.

The support body 50 is constituted of an outer frame section 501 having a rectangular frame shape, four supporting columns 502 installed in the four corners of the outer frame section 501, a beam section 503 having a cross shape disposed so as to join the tip ends of each supporting column 502, and a protrusion 504 having a cone shape disposed in the central, crossing part of the beam section 503.

The outer frame section 501 is secured to the outer-circumferential section of the pedestal 11 so that the protrusion 504 is positioned in the bottom surface side of the plumb bob 15. Here, a setting is made such that the tip end 504a of the protrusion 504 is positioned at a distance d1 from the bottom surface side of the plumb bob 15. The distance d1 is set to a value by which the displacement of each of the diaphragm pieces 13c and 13d can be limited by the protrusion 504 so that the diaphragm pieces are not stretched excessively even when an acceleration is generated in a direction orthogonal to the surface of the diaphragm 13 and force of a predetermined value or more caused by the acceleration is exerted on one surface side of the diaphragm 13, i.e., on the side where the plumb bob 15 is present.

In this manner, according to the semiconductor acceleration sensor 10B of the second embodiment having the above described configuration, as shown in FIG. 20, when an acceleration is applied such that force 43 including a force component in a direction orthogonal to the surface of the diaphragm 13 is exerted and force of a predetermined value or more is exerted on the other surface side of the diaphragm 13, the diaphragm 13 is distorted and stretched in a direction of the force 43 working. However, the displacement is supported and limited by the tip end 164a of the protrusion 164, so the diaphragm pieces 13c and 13d cannot be stretched to a maximum. Further, referring to FIG. 19, when an acceleration is applied such that force including a force component in a downward direction is exerted and force of a predetermined value or more is exerted on the bottom surface side of the plumb bob 15, also, the displacement is similarly supported and limited by the tip end 504a of the protrusion 504, so the diaphragm pieces 13c and 13d cannot be stretched to a maximum.

Accordingly, when an acceleration is generated in a direction orthogonal to the surface of the diaphragm 13 and force of a predetermined value or more by the acceleration is exerted, the position of the plumb bob 15 changes with the tip end 504a of the protrusion 504 acting as a supporting point. Thus, even when the cross section area of the diaphragm pieces 13a to 13d is reduced to vary the sensitivity, accelerations in two directions parallel to the surface of the diaphragm and orthogonal to each other can be effectively sensed.

It is noted that when one of the support bodies 16 and 50 is not required, only the other one of the support bodies 16 and 50 may be provided.

Also, the configuration of the present invention is not limited to the above described embodiments, and many modifications to the embodiments are possible without departing from the subject matter of the invention.

INDUSTRIAL APPLICABILITY OF THE INVENTION

When there is used an acceleration sensor with a plurality of beams whose cross section area orthogonal, respectively, to one of the X axis and Y axis directions parallel to the surface of the diaphragm and orthogonal to each other are set according to a maximum value of acceleration in the X axis or Y axis direction, accelerations in the X axis and Y axis directions can be sensed with respective proper sensitivities. Accordingly, the sensor is applicable to a vehicle for which different sensitivity between the longitudinal direction and lateral direction of the vehicle is required.

The invention claimed is:

1. A semiconductor acceleration sensor, comprising:
a silicon wafer having a cross-shaped diaphragm formed within a wafer outer-circumferential frame section;
a pedestal securing the wafer outer-circumferential frame section;
one plumb bob disposed in a center of one surface of the diaphragm; and
a plurality of beams extending, respectively, from the center of the surface of the diaphragm to the wafer outer-circumferential frame section along X axis and Y axis directions parallel to the surface of the diaphragm and orthogonal to each other,
wherein the thickness of the beam along the X axis direction is different from the thickness of the beam along the Y axis direction, the thicknesses of each of beams are set according to maximum values of respective accelerations in the X axis and Y axis directions.

2. The semiconductor acceleration sensor according to claim 1, wherein in each of the beam disposed along the X axis direction and the beam disposed along the Y axis direction, the thicknesses at two points symmetrical around the center is identical.

3. The semiconductor acceleration sensor according to claim 1, wherein in the either one at least in the beam disposed along the X axis direction and the beam disposed along the Y axis direction, the thicknesses increases in a direction from the center to the wafer outer-circumferential frame section.

4. The semiconductor acceleration sensor according to claim 1, wherein to allow sensing of respective accelerations in the X axis and Y axis directions and a Z axis direction orthogonal to the surface of the diaphragm, a diffused resistor is arranged in each of the plurality of beams and at the same time, on the wafer outer-circumferential frame section corresponding to each of the plurality of beams, there is provided an connection electrode connected to the diffused resistor.

5. The semiconductor acceleration sensor according to claim 1, wherein the diaphragm is a silicon piezo diaphragm.

6. The semiconductor acceleration sensor according to claim 1, wherein in at least one in one surface side and the other surface side of the diaphragm, there is provided a protrusion secured to a position spaced with a predetermined gap from at least one in the surface of the center of the diaphragm and from a surface of the plumb bob corresponding to a center, and protruding opposite the center.

7. The semiconductor acceleration sensor according to claim 6, wherein the protrusion is secured and supported to at least one in the wafer outer-circumferential frame section and the pedestal and disposed at a position spaced with a predetermined gap from the center of the other surface of the diaphragm so as to protrude opposite the center of the other surface of the diaphragm.

8. The semiconductor acceleration sensor according to claim 6, wherein that the protrusion is joined and supported to at least one in the wafer outer-circumferential frame section and the pedestal and disposed at a position spaced with a predetermined gap from the center of the plumb bob so as to protrude opposite the surface of the plumb bob.

9. The semiconductor acceleration sensor according to claim 6, wherein a tip end of the protrusion corresponding to at least one in the surface of the center of the diaphragm and to the surface of the plumb bob corresponding to the center has a cone-shaped tip end configuration.

* * * * *